United States Patent
Tharaperiya Gamage et al.

(10) Patent No.: US 11,411,876 B2
(45) Date of Patent: Aug. 9, 2022

(54) OPTIMIZING SEGMENT ROUTING PATHS USING SEGMENT IDENTIFIERS

(71) Applicant: Cisco Technology, Inc., San Jose, CA (US)

(72) Inventors: Amila Pradeep Kumara Tharaperiya Gamage, Kanata (CA); Darren Russell Dukes, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 66 days.

(21) Appl. No.: 17/106,651

(22) Filed: Nov. 30, 2020

(65) Prior Publication Data

US 2022/0174016 A1  Jun. 2, 2022

(51) Int. Cl.
| | | |
|---|---|---|
| *H04L 47/2441* | (2022.01) | |
| *H04L 47/2483* | (2022.01) | |
| *H04L 101/375* | (2022.01) | |
| *H04L 45/00* | (2022.01) | |
| *H04L 47/33* | (2022.01) | |

(52) U.S. Cl.
CPC ........ *H04L 47/2441* (2013.01); *H04L 45/38* (2013.01); *H04L 47/2483* (2013.01); *H04L 47/33* (2013.01); *H04L 61/3075* (2013.01)

(58) Field of Classification Search
None
See application file for complete search history.

(56) References Cited

U.S. PATENT DOCUMENTS

| | | | | |
|---|---|---|---|---|
| 10,652,133 | B1 * | 5/2020 | Morris | H04L 45/04 |
| 2005/0141429 | A1 * | 6/2005 | Jayakrishnan | H04L 47/10 |
| | | | | 370/236 |
| 2017/0111261 | A1 * | 4/2017 | Francois | H04L 45/125 |
| 2017/0346720 | A1 * | 11/2017 | Lazzeri | H04L 45/20 |
| 2019/0190818 | A1 | 6/2019 | Ceccarelli et al. | |
| 2020/0213223 | A1 | 7/2020 | Peng et al. | |
| 2020/0351766 | A1 * | 11/2020 | Young | H04L 45/741 |
| 2021/0029021 | A1 * | 1/2021 | Torvi | G06F 16/2379 |
| 2021/0328905 | A1 * | 10/2021 | Skalecki | H04L 45/10 |
| 2021/0352011 | A1 * | 11/2021 | Boutros | H04L 45/50 |

FOREIGN PATENT DOCUMENTS

WO  WO2017141081 A1  8/2017

OTHER PUBLICATIONS

Tulumello, Angelo; et al., "Micro Sids: A Solution for Efficient Representation of Segment IDS in SRV6 Networks," Published by arXiv.org, Date Published: Jul. 28, 2020, 12 pages.

* cited by examiner

*Primary Examiner* — Yaotang Wang
(74) *Attorney, Agent, or Firm* — Lee & Hayes, P.C.

(57) ABSTRACT

Techniques for optimizing segment routing (SR) paths using segment identifiers (SIDs) are disclosed, including determining a packet is to be sent from a first node to a second node of a network using an SR method. The techniques may also include determining a segment quantization factor that is representative of a first number of SIDs that are included in a segment quantization interval. Based at least in part on the segment quantization factor and a cost constraint, an SR path defined by a second number of SIDs to send the packet may be determined. The second number of SIDs may be associated with maximizing the SIDs included in individual ones of segment quantization intervals. The techniques further include modifying the packet to include at least the second number of SIDs and causing the packet to flow from the first node to the second node via the SR path.

20 Claims, 7 Drawing Sheets

FIG. 3A

| Next Header 302 | Header Length 304 | Routing Type 306 | Segments Left 308 |
|---|---|---|---|
| Last Entry 310 | Flags 312 | Tag 314 | |
| First SID Address 316A ||||
| Second SID Address 316B ||||
| Third SID Address 316C ||||
| ... ||||
| Nth SID Address 316N ||||

FIG. 3B

| Next Header 302 | Header Length 304 | Routing Type 306 | Segments Left 308 |
|---|---|---|---|
| Last Entry 310 | Flags 312 | Tag 314 | |
| First uSID 318A | Second uSID 318B | Third uSID 318C | Fourth uSID 318D | Fifth uSID 318E | Sixth uSID 318F |
| Seventh uSID 318G | Eighth uSID 318H | Ninth uSID 318I | Tenth uSID 318J | Eleventh uSID 318K | Nth uSID 318N |

400 ⟶

```
┌─────────────────────────────────────────────────────────────┐
│ DETERMINE, AT A COMPUTING DEVICE, THAT A PACKET IS TO BE     │
│ SENT FROM A FIRST NODE OF A NETWORK TO A SECOND NODE OF      │
│ THE NETWORK USING SEGMENT IDENTIFIERS (SIDs) OF A SEGMENT    │
│ ROUTING (SR) METHOD                                          │
│ 402                                                          │
└─────────────────────────────────────────────────────────────┘
                              │
                              ▼
┌─────────────────────────────────────────────────────────────┐
│ DETERMINE A SEGMENT QUANTIZATION FACTOR THAT IS              │
│ REPRESENTATIVE OF A FIRST NUMBER OF SIDs THAT ARE INCLUDED   │
│ IN A SEGMENT QUANTIZATION INTERVAL                           │
│ 404                                                          │
└─────────────────────────────────────────────────────────────┘
                              │
                              ▼
┌─────────────────────────────────────────────────────────────┐
│ DETERMINE AN SR PATH DEFINED BY A SECOND NUMBER OF SIDs TO   │
│ SEND THE PACKET BASED AT LEAST IN PART ON THE SEGMENT        │
│ QUANTIZATION FACTOR AND A COST CONSTRAINT, WHEREIN THE       │
│ SECOND NUMBER OF SIDs IS ASSOCIATED WITH MAXIMIZING THE      │
│ SIDs INCLUDED IN INDIVIDUAL ONES OF SEGMENT QUANTIZATION     │
│ INTERVALS                                                    │
│ 406                                                          │
└─────────────────────────────────────────────────────────────┘
                              │
                              ▼
┌─────────────────────────────────────────────────────────────┐
│ MODIFY THE PACKET TO INCLUDE AT LEAST THE SECOND NUMBER      │
│ OF SIDs                                                      │
│ 408                                                          │
└─────────────────────────────────────────────────────────────┘
                              │
                              ▼
┌─────────────────────────────────────────────────────────────┐
│ CAUSE THE PACKET TO FLOW FROM THE FIRST NODE TO THE SECOND   │
│ NODE VIA THE SR PATH                                         │
│ 410                                                          │
└─────────────────────────────────────────────────────────────┘
```

┌─────────────────────────────────────────────────────────────┐
│ DETERMINE ONE OR MORE SHORTEST SEGMENT ROUTING (SR) PATHS BETWEEN A │
│ FIRST NODE AND A SECOND NODE USING, AT MOST, ONE SEGMENT IDENTIFIER (SID) │
│ 502 │
└─────────────────────────────────────────────────────────────┘
                              ↓
┌─────────────────────────────────────────────────────────────┐
│ BASED AT LEAST IN PART ON THE PATHS COMPUTED IN OPERATION 502, DETERMINE │
│ THE SHORTEST SR PATHS BETWEEN THE FIRST NODE AND THE SECOND NODE │
│ USING, AT MOST, TWO SIDs │
│ 504 │
└─────────────────────────────────────────────────────────────┘
                              ↓
┌─────────────────────────────────────────────────────────────┐
│ BASED AT LEAST IN PART ON THE PATHS COMPUTED IN OPERATION 504, DETERMINE │
│ THE SHORTEST SR PATHS BETWEEN THE FIRST NODE AND THE SECOND NODE │
│ USING, AT MOST, AN AMOUNT OF SIDs THAT IS EQUAL TO A NUMBER OF MICRO │
│ SIDs CONTAINABLE WITHIN A MICRO SID CARRIER │
│ 506 │
└─────────────────────────────────────────────────────────────┘
                              ↓
┌─────────────────────────────────────────────────────────────┐
│ BASED AT LEAST IN PART ON THE PATHS COMPUTED IN OPERATION 506, DETERMINE │
│ THE SHORTEST SR PATHS BETWEEN THE FIRST NODE AND THE SECOND NODE │
│ USING, AT MOST, TWO MICRO SID CARRIERS │
│ 508 │
└─────────────────────────────────────────────────────────────┘
                              ↓
┌─────────────────────────────────────────────────────────────┐
│ BASED AT LEAST IN PART ON THE PATHS COMPUTED IN OPERATION 508, DETERMINE │
│ THE SHORTEST SR PATHS BETWEEN THE FIRST NODE AND THE SECOND NODE │
│ USING, AT MOST, A MAXIMUM AMOUNT OF MICRO SID CARRIERS │
│ 510 │
└─────────────────────────────────────────────────────────────┘
                              ↓
┌─────────────────────────────────────────────────────────────┐
│ BASED AT LEAST IN PART ON THE PATHS DETERMINED IN OPERATIONS 506-510, │
│ IDENTIFY THE SR PATH WITH THE MINIMUM AMOUNT OF MICRO SID CARRIERS │
│ WHOSE PATH COST IS LESS THAN A THRESHOLD PATH COST │
│ 512 │
└─────────────────────────────────────────────────────────────┘
                              ↓
┌─────────────────────────────────────────────────────────────┐
│ CAUSE TRAFFIC TO FLOW FROM THE FIRST NODE TO THE SECOND NODE USING THE │
│ IDENTIFIED SR PATH │
│ 514 │
└─────────────────────────────────────────────────────────────┘

```
┌─────────────────────────────────────────────────────────────────┐
│ DETERMINE, AT A COMPUTING DEVICE, THAT A PACKET IS TO BE SENT    │
│ FROM A FIRST NODE OF A NETWORK TO A SECOND NODE OF THE NETWORK   │
│ USING A SEGMENT ROUTING (SR) METHOD                              │
│ 602                                                              │
└─────────────────────────────────────────────────────────────────┘
                                  ↓
┌─────────────────────────────────────────────────────────────────┐
│ DETERMINE A FIRST QUANTITY OF SEGMENT IDENTIFIERS (SIDs)         │
│ ASSOCIATED WITH SENDING THE PACKET FROM THE FIRST NODE TO THE    │
│ SECOND NODE SUCH THAT A PATH COST ASSOCIATED WITH THE FIRST      │
│ QUANTITY OF SIDs IS LESS THAN A THRESHOLD PATH COST              │
│ 604                                                              │
└─────────────────────────────────────────────────────────────────┘
                                  ↓
┌─────────────────────────────────────────────────────────────────┐
│ DETERMINE THAT THE FIRST QUANTITY OF SIDs IS LESS THAN A MICRO   │
│ SID CARRIER CAPACITY                                             │
│ 606                                                              │
└─────────────────────────────────────────────────────────────────┘
                                  ↓
┌─────────────────────────────────────────────────────────────────┐
│ BASED AT LEAST IN PART ON THE FIRST QUANTITY BEING LESS THAN THE │
│ MICRO SID CARRIER CAPACITY, DETERMINE AN SR PATH BETWEEN THE     │
│ FIRST NODE AND THE SECOND NODE, THE SR PATH BEING DEFINED BY A   │
│ SECOND QUANTITY OF SIDs THAT IS EQUAL TO THE MICRO SID CARRIER   │
│ CAPACITY                                                         │
│ 608                                                              │
└─────────────────────────────────────────────────────────────────┘
                                  ↓
┌─────────────────────────────────────────────────────────────────┐
│ MODIFY THE PACKET TO INCLUDE THE SECOND QUANTITY OF SIDs,        │
│ WHEREIN INDIVIDUAL ONES OF THE SECOND QUANTITY OF SIDs ARE       │
│ REPRESENTED BY INDIVIDUAL ONES OF MICRO SIDs                     │
│ 610                                                              │
└─────────────────────────────────────────────────────────────────┘
                                  ↓
┌─────────────────────────────────────────────────────────────────┐
│ CAUSE THE PACKET TO FLOW FROM THE FIRST NODE TO THE SECOND NODE  │
│ VIA THE SR PATH                                                  │
│ 612                                                              │
└─────────────────────────────────────────────────────────────────┘
```

FIG. 6

OPTIMIZING SEGMENT ROUTING PATHS USING SEGMENT IDENTIFIERS

TECHNICAL FIELD

The present disclosure relates generally to improved technologies in the field of segment routing, and more specifically to optimizing segment routing paths using segment identifiers.

BACKGROUND

Segment Routing (SR) is a flexible, scalable way of doing source routing. According to an SR method, a source may choose a path and encode the path in a packet header as an ordered list of segments and/or instructions. Each segment is identified by its segment identifier (SID). As such, with segment routing networks no longer need to maintain a per-application and/or per-flow state, and instead, the networks simply obey the forwarding instructions provided in the packet.

With respect to SR packets themselves, reducing the number of SIDs in a packet increases network efficiency due to reduced overhead. However, reducing the number of SIDs used for a path may result in higher cost and/or higher latency paths. To balance overhead and path cost, various techniques have been proposed for determining the path with a minimum number of SIDs subject to a margin constraint. However, in some instances a preferred number of SIDs for the path may be different than the minimum number.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3A illustrates a block diagram of an example segment routing header of an SID packet. The segment routing header includes one or more SID addresses that correspond with one or more SR path segments.

FIG. 3B illustrates a block diagram of an example segment routing header of an SID packet. The segment routing header includes one or more micro SID addresses that correspond with one or more SR path segments.

FIG. 4 illustrates a flow diagram of an example method for optimizing an SR path using micro SIDs.

FIG. 5 illustrates a flow diagram of another example method for optimizing an SR path using micro SIDs.

FIG. 6 illustrates a flow diagram of yet another example method for optimizing an SR path using micro SIDs.

DESCRIPTION OF EXAMPLE EMBODIMENTS

Overview

Figure 1:
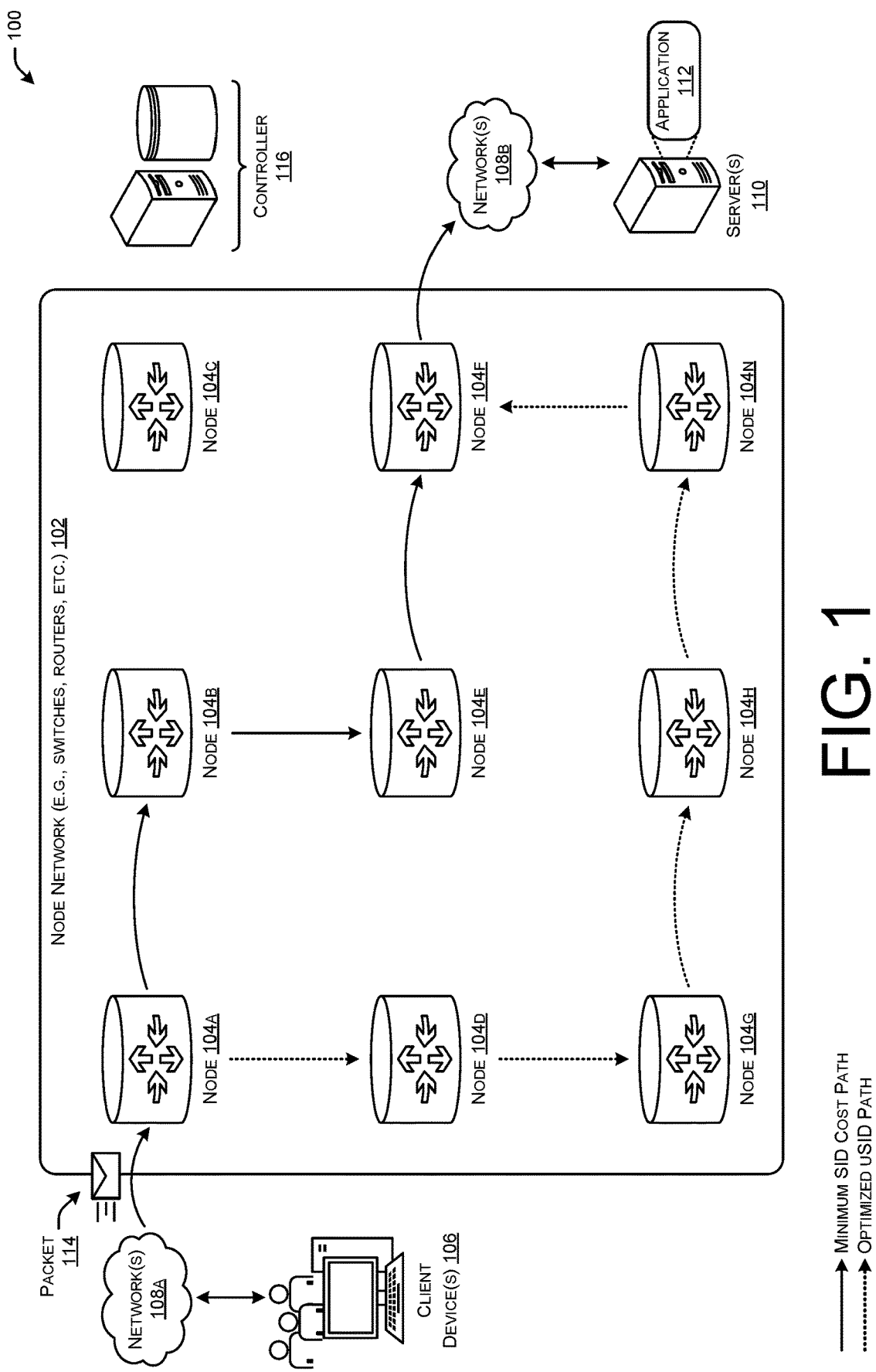
FIG. 1 illustrates a system-architecture diagram of an example environment in which SID optimization is used to send packets between various nodes of the node network.

This disclosure describes various technologies for optimizing segment routing (SR) paths using segment identifiers (SIDs). By way of example, and not limitation, a method according to the various technologies presented in this disclosure may include determining, at a computing device, that a packet is to be sent from a first node of a network to a second node of the network using SIDs of an SR method. The method may also include determining a first number of micro SIDs that are included in a micro SID carrier. An SR path defined by a second number of SIDs to send the packet may then be determined based at least in part on the first number of micro SIDs and a cost constraint. The second number of SIDs may be associated with maximizing the first number of micro SIDs included in individual ones of the micro SID carriers. The method may further include modifying the packet to include at least the first number of micro SIDs and causing the packet to flow from the first node to the second node via the SR path.

Additionally, the techniques described herein may be performed as a method and/or by a system having non-transitory computer-readable media storing computer-executable instructions that, when executed by one or more processors, performs the techniques described above.

EXAMPLE EMBODIMENTS

As noted above, reducing the number of SIDs in a packet increases network efficiency due to reduced overhead. However, reducing the number of SIDs used for a path may result in higher cost and/or higher latency paths. To balance overhead and path cost, various techniques have been proposed for determining the path with a minimum number of SIDs subject to a margin constraint.

However, these techniques do not solve the cases where, for example, the preferred number of segments for the path is not simply a minimum. This is the case for an SRv6 micro SID based network. Minimizing the segment list within the quantization size of, for instance, the micro SID carrier, can result in selection of a path within the metric margin but of poorer quality than a longer segment list within the same quantum. In other words, computing a path with a minimum number of segments results in a poorer quality path than computing a path with minimum number of quanta (e.g., minimum number of segments to completely fill a micro SID carrier). Additionally, similar deficiencies exist in Multiprotocol Label Switched (MPLS) data planes that use source routing. Accordingly, described herein are various technologies for optimizing SR paths using micro SIDs, which are equally applicable for SRv6 based networks, MPLS data plane networks, and other source routing networks.

By way of example, and not limitation, a method according to some of the various technologies of this disclosure may include determining, at a computing device, that a packet is to be sent from a first node of a network to a second node of the network using segment identifiers of a segment routing method. The packet may be sent from the first node to the second node via one or more intermediate nodes that are disposed along an SR path between the first node and the second node. The first node, the second node, and the one or more intermediate nodes may be associated with a network of nodes used for communicating data to various devices that utilize the network of nodes. In some examples, the first node, the second node, and/or the intermediate nodes may comprise various networking and/or computing devices, such as routers, switches, hubs, gateways, and the like. Additionally, the first node, the second node, and/or the intermediate nodes may communicate with one another via one or more wired and/or wireless links.

In some examples, the method may further include determining a first number of micro SIDs that are included in a micro SID carrier. In other words, the method may include determining a capacity of a micro SID carrier for the network. As used herein, the term "micro SID carrier," or "uSID carrier," means a maximum number of individual micro SIDs that may be contained within a micro SID carrier. For example, in most network configurations, a micro SID may be represented with 2 bytes, and up to 6 micro SIDs may be carried in a regular 16-byte SID. Thus, in cases where the micro SID is represented with 2 bytes, the micro SID carrier capacity is 6. However, it is contemplated that different choices are possible for micro SID size depending on the network, and micro SIDs may be represented with 3 bytes, 4 bytes, and so on. As such, for a micro SID that is represented by 3 bytes, up to 4 micro SIDs may be carried in a regular 16-byte SID (micro SID carrier capacity equals 4), and for a micro SID represented by 4 bytes, up to 3 micro SIDs may be carried on a regulate 16-byte SID (micro SID carrier capacity equals 3). In some examples, the capacity of a micro SID carrier for a specific network may be set by a network administrator, a consumer of the network, and the like.

In some examples, the method may include determining an SR path defined by a second number of SIDs to send the packet from the first node to the second node. Determining the SR path may, in some examples, be based at least in part on the first number of micro SIDs (e.g., the capacity of a micro SID carrier). The second number of SIDs may be associated with maximizing the first number of micro SIDs included in individual ones of the micro SID carriers. For instance, if the first number of micro SIDs (capacity of micro SID carrier) is 6, then the second number of SIDs should be equal to multiples of 6 (e.g., 6, 12, 18, 24, and so forth) in order to completely fill a micro SID carrier to its maximum capacity with micro SIDs that represent the SIDs.

Additionally, or alternatively, determining the SR path may be based at least in part on a cost constraint. As noted above, as the quantity of SIDs increases, the cost of the SR path decreases. Thus, the second number of SIDs of the SR path may be greater than or equal to a minimum number of SIDs associated with keeping the cost of the SR path below the cost constraint. In at least one example, determining the SR path may be based at least in part on determining the minimum number of SIDs associated with sending the packet from the first node to the second node while maintaining the path cost at a value that is less than or equal to the cost constraint. However, the minimum number of SIDs associated with keeping the cost of the SR path below the cost constraint may be less than the maximum capacity of one or more micro SID carriers.

In some examples, the cost constraint may be associated with a monetary cost (e.g., a dollar amount associated with sending the packet), a latency, a TE cost, an IGP cost, and the like. The cost constraint may comprise a maximum path cost that is associated with a sum of a user specified margin and a cost of the SR path when using a number of micro SID carriers that is equal to the network maximum of micro SID carriers. In other words, the cost of the SR path, in at least one example, should be less than the sum of user specified margin plus the cost of the SR path with at most the network maximum of micro SID carriers.

In some examples, the method may include modifying the packet to include at least the first number of micro SIDs, and then causing the packet to flow from the first node to the second node via the SR path. For instance, each one of the second number of SIDs may be modified such that a first SID of the second number of SIDs is represented by a first micro SID of the first number of micro SIDs, and so forth. In other words, each individual segment of the SR path may be represented by a respective micro SID that comprises less bits or bytes than a traditional, 16-byte SID.

The techniques described herein are generally applicable for any type of source routing method, including segment routing, micro SID based segment routing, MPLS data plane routing, and the like. According to the techniques described herein, source routing packet headers that use micro SIDs may fully utilize the capacity of a 16-byte SID when sending packets between nodes. This reduces the path cost associated with sending the packet between nodes, while, at the same time, minimizing the overhead of the packet and resulting in increased network efficiency. This approach has benefits over state-of-the-art approaches even when SR paths are determined using minimum cost path techniques.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which micro SID optimization is used to send packets between various nodes of the node network 102. The node network 102 may include one or more nodes 104A-104N (hereinafter referred to collectively as "nodes 104," where N represents any number greater than or equal to one). The nodes 104 may include switches, routers, hubs, gateways, load balancers, any combination thereof, and the like. In various examples, the nodes 104 may be disposed in different geographic locations and communicate with one another via one or more wired or wireless links. Each of the nodes 104 may comprise a corresponding SID and/or micro SID. Additionally, or alternatively, each link between nodes may comprise a corresponding SID and/or micro SID.

The one or more client devices 106 may communicate over one or more networks 108A with nodes of the node network 102. As shown in FIG. 1, node 104A serves as an edge node to provide the client devices 106 with communications over the node network 102. In some examples, the client devices 106 may establish communication with one or more servers 110 via the networks 108A and 108B, as well as via individual nodes of the node network 102, in order to consume and/or use an application 112 that is running on the one or more servers 110, such as a virtual machine. The one or more client devices 106 may comprise any type of devices configured to communicate using various communication protocols over the networks 108A. For instance, the client devices 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device The networks 108A and 108B (hereinafter referred to collectively as "networks 108") may include one or more networks implemented by any viable communication technology, such as wired and/or wireless modalities and/or technologies. The networks 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The one or more servers 110 may provide services for the client devices 106, such as an application 112. Generally, the servers 110 may provide basic resources such as processor (CPU), memory (RAM), storage (disk), and networking (bandwidth). Additionally, in some examples, the servers 110 may provide, host, or otherwise support one or more application services for client devices 106 to connect to and use.

In some instances, the servers 110 may be stored in various data centers located at different physical locations. For instance, a first server may be stored in a first data center located in a first geographic location and second server may be stored in a second data center located in a second geographic location. The first server may be associated with a first node of the node network 102 and a second server may be associated with a second node of the node network 102. The data centers may be physical facilities or buildings located across geographic areas that are designated to store networked devices. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

As shown in FIG. 1, packets, such as packet 114, that are sent by the client devices 106 may traverse the node network 102 according to an SR path in order to reach the servers 110. A minimum SID cost path is shown in solid lines, and an optimized micro SID (uSID) path is shown in broken lines. In examples, the controller 116 may determine SR paths for each of the nodes 104 to communicate with one another at a minimum cost and with minimum overhead. Accordingly, the controller 116 may determine that the minimum SID cost path is achieved by including four SIDs (corresponding with nodes 104A, 104B, 104E, and 104F) in an SR header of the packet 114 in order for the SR path to have minimum cost and with minimum overhead. However, in a micro SID based source routing network, the controller 116 may additionally determine that a maximum of 6 micro SIDs may be included in the SR header of the packet 114. As such, the controller 116 may determine that the packet 114 is to be sent using the optimized micro SID path (via nodes 104A, 104D, 104G, 104H, 104N, and 104F), thereby resulting in an even lower cost path than the minimum SID cost path while not increasing overhead.

Figure 2:
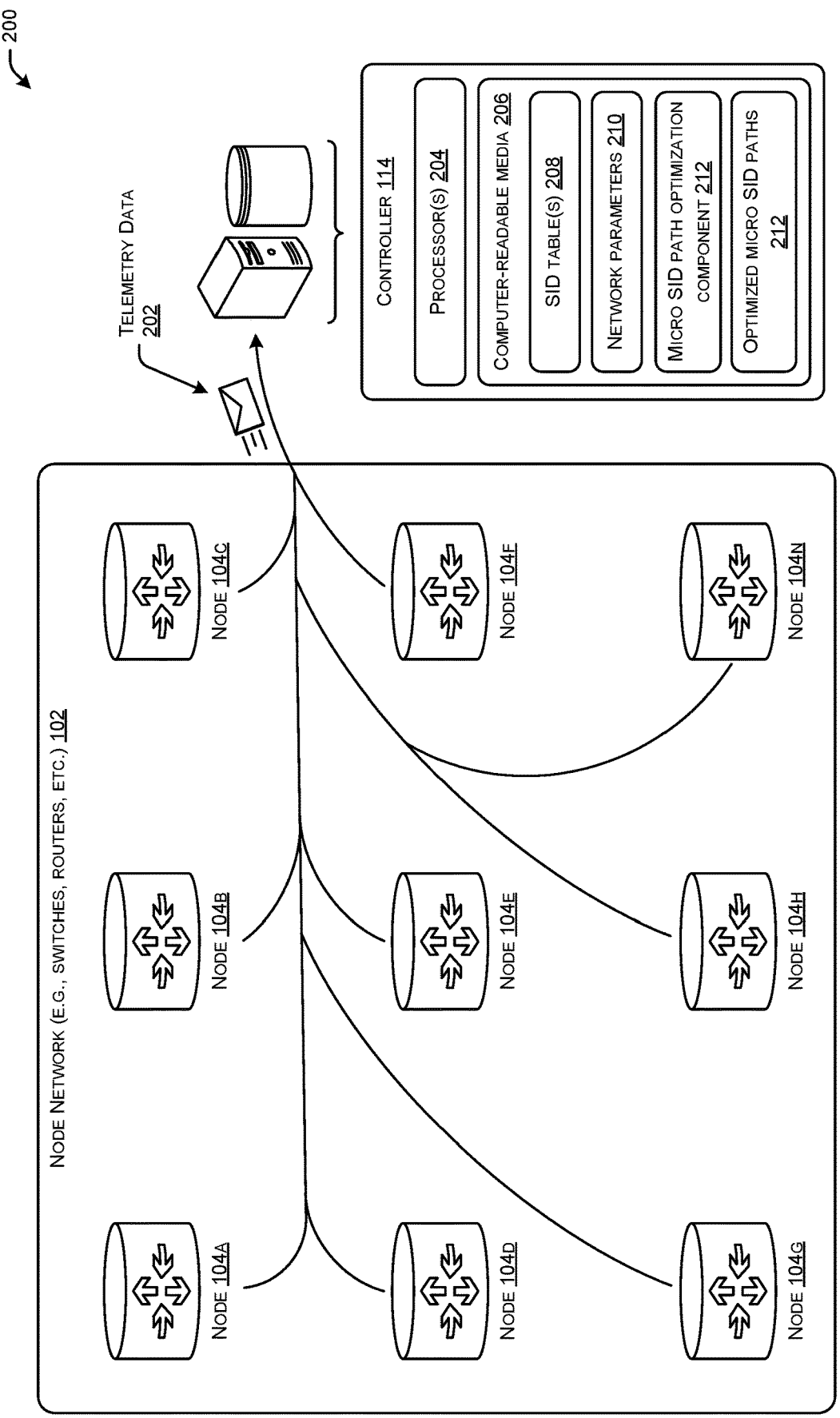
FIG. 2 illustrates a system-architecture diagram of an example environment that includes a node network and a controller. The controller may receive telemetry data from one or more of the individual nodes of the node network and, among other things, determine optimized SID paths between nodes.

FIG. 2 illustrates a system-architecture diagram of an example environment 200 that includes a node network 102 and a controller 114. The controller 114 may receive telemetry data 202 from one or more of the individual nodes 104A-104N of the node network 102 and, among other things, determine optimized micro SID paths between nodes. The telemetry data 202 may include, among other things, adjacent nodes for each individual node of the node network 102, latency between a first node and a second node (e.g., nodes 104A and 104D) of the node network 102, node parameters, virtual routing and forwarding (VRF) tables, data plane parameters, and the like. In some examples, as shown in FIG. 2, the controller 114 may be able to communicate directly with each one of the nodes 104 via one or more wired and/or wireless links. Additionally, or alternatively, the controller 114 may communicate with some nodes of the node network 102 through other nodes of the node network 102 (e.g., communicate with node 104A through nodes 104B and 104C).

The controller 114 may include one or more processors 204 and one or more computer-readable media 206. The processors 204 may comprise one or more cores and may perform one or more operations on behalf of the controller 114. The computer-readable media 206 may store various data associated with one or more devices of the environment 200, including one or more SID tables 208, network parameters 210, and optimized micro SID paths 212, such as the optimized micro SID path shown in FIG. 1. Additionally, the controller 114 may store one or more executable components (e.g., software-based components, firmware-based components, etc.), such as a micro SID path optimization component 212.

The micro SID path optimization component 212 may access data stored in the one or more SID tables 208 and/or the network parameters 210 in order to determine and/or compute one or more optimized micro SID paths. For instance, the micro SID path optimization component 212 may access cached data stored in the SID tables 208 that indicates shortest SR paths between nodes and may also access data associated with the network parameters 210 in order to determine optimized micro SID paths between nodes. After determining and/or computing an optimized micro SID path, the micro SID path optimization component 212 may store the path in the optimized micro SID paths 212 database.

FIG. 3A illustrates a block diagram of an example segment routing header 300A of an SID packet. The segment routing header 300A includes one or more SID addresses that correspond with one or more SR path segments. The segment routing header 300A may be used to route a packet from a first node of a network to a second node of a network according to a source routing method.

As shown in FIG. 3A, the segment routing header 300A may include various data fields and/or layers, such as the next header field 302, header length field 304, routing type field 306, segments left field 308, last entry field 310, flags field 312, and the tag field 314. Additionally, the segment routing header 300A may include a segment list that includes one or more SID addresses, such as the first SID address 316A, second SID address 316B, third SID address 316C, and the Nth SID address 316N (where N may represent any number greater than or equal to one).

The next header field 302, may include an 8-bit selector that identifies the type of header immediately following the segment routing header 302. The header length field 304 may include an 8-bit unsigned integer that indicates the length of the segment routing header 304 in 8-octet units, not including the first 8 octets. The routing type field 306 may include an 8-bit identifier that indicates the type of routing protocol to be used for sending packets (e.g., a particular routing header variant). The segments left field 308 may include an 8-bit unsigned integer that indicates a number of route segments remaining. In other words, the segments left field 308 may indicate the number of explicitly listed intermediate nodes still to be visited before reaching the final destination. A value of the 8-bit unsigned integer in the segments left field 308 may be decremented at each segment.

The last entry field 310 may contain an index, in the segment list, of the last element of the segment list (e.g., the Nth SID address 316N). The flags field 312 may include 8-bits of flags. Individual flags included in the flags field 312 may be associated with different meanings. For instance, a P-flag may indicate a protected flag, an O-flag may represent an operations and management (OAM) flag, an A-flag may represent an alert flag, and so forth. Finally, the tag field 314 may tag a packet as part of a class or group of packets (e.g., packets sharing the same set of properties).

The segment list of the segment routing header 300A may include one or more 128-bit (16-byte) IPv6 addresses (SID addresses) representing the individual segment of an SR path. In some examples, the segment list is encoded starting from the last segment of the path. In other words, the first element of the segment list (the first SID address 316A) contains the last segment of the path, the second element (second SID address 316B) contains the second to last segment of the SR path, the third element (third SID address 316C) contains the third to last segment of the SR path, and so forth. Each one of the SID addresses of the segment list may correspond with a specific segment of the SR path. For instance, the first SID address 316A may correspond with a first node and/or segment, the second SID address 316B may correspond with a second node and/or segment, the third SID address 316C may correspond with a third node and/or segment, and so forth.

FIG. 3B illustrates a block diagram of an example segment routing header 300B of an SID packet. The segment routing header 300B includes a segment list containing one or more micro SID addresses that correspond with one or more SR path segments. As shown, the segment routing header 300B may include the same or similar data fields and/or layers as segment routing header 300A described above, such as the next header field 302, header length field 304, routing type field 306, segments left field 308, last entry field 310, flags field 312, and the tag field 314.

Additionally, the segment routing header 300B may include a segment list that includes one or more micro SID (uSID) addresses 318A-318N (hereinafter referred to collectively as "micro SID addresses 318," and where N may represent any number greater than or equal to one). The micro SID addresses 318 may comprise 16-bit (2-byte) IPv6 addresses representing at least one of an individual segment of an SR path or a micro SID carrier associated with the SR path. For instance, the first micro SID address 318A may correspond with a first node, segment, and/or the first SID address 316A, the second micro SID address 318B may correspond with a second node, segment, and/or the second SID address 316B, the third micro SID address 318C may correspond with a third node, segment, and/or the third SID address 316C, and so forth. In some examples, the segment list is encoded starting from the last segment of the path. In other words, the first element of the segment list (the first micro SID address 318A) contains the last segment of the path, the second element (second micro SID address 318B) contains the second to last segment of the SR path, the third element (third micro SID address 318C) contains the third to last segment of the SR path, and so forth.

As shown, up to six 16-bit (2-byte) micro SIDs 318A-318F may be included in a micro SID carrier. A micro SID carrier may comprise a 128-bit (16-byte) data field. In other words, a micro SID carrier may correspond with an individual, traditional SID field. Although shown in FIG. 3B as 16-bit (2-byte) micro SIDs for illustration purposes, it is contemplated that other configurations of micro SIDs may be used. For instance, 24-bit (3-byte) micro SIDs may be used and up to four 24-bit (3-byte) a micro SIDs may be contained within a micro SID carrier. Additionally, or alternatively, 32-bit (4-byte) micro SIDs may be used and up to three 32-bit (4-byte) a micro SIDs may be contained within a micro SID carrier.

FIGS. 4, 5, and 6 illustrate flow diagrams of example methods that illustrate aspects of the functions performed at least partly by the nodes 104 and/or the controller 116 as described in FIGS. 1 and 2. The logical operations described herein with respect to FIGS. 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5, and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for optimizing an SR path using micro SIDs. The method 400 begins with operation 402, during which a computing device determines that a packet is to be sent from a first node of a network to a second node of the network using segment identifiers (SIDs) of a segment routing (SR) method. The packet may be sent from the first node to the second node via one or more intermediate nodes that are disposed along an SR path between the first node and the second node. The first node, the second node, and the one or more intermediate nodes may be associated with a network of nodes used for communicating data to various devices that utilize the network of nodes. In some examples, nodes may comprise various networking and/or computing devices, such as routers, switches, hubs, gateways, and the like. Additionally, the first node, the second node, and/or the intermediate nodes may communicate with one another via one or more wired and/or wireless links.

At operation 404, the method 400 includes determining a segment quantization factor that is representative of a first number of SIDs that are included in a segment quantization interval. In some instances, the segment quantization factor may be representative of a capacity of a micro SID carrier for the network. In some examples, the capacity of a micro SID carrier for the network may be able to hold up to six micro SIDs, five micro SIDs, four micro SIDs, or another amount of micro SIDs specified by the network. The capacity of a micro SID carrier for a specific network may be set by a network administrator, a consumer of the network, and the like. In various examples, determining the segment quantization factor may be based at least in part on a node that programs the segment list to the data packets. The segment quantization factor may represent the number of SIDs that can be pushed in a single pass in a forwarding application-specific integrated circuit (ASIC), the number of micro SIDs in a micro SID carrier, and the like. When the segment quantization factor represents the number of SIDs that can be pushed in a single pass in a forwarding ASIC, segment lists are determined such that the maximum number of SIDs are pushed in each forwarding pass.

At operation 406, the method 400 includes determining an SR path defined by a second number of SIDs to send the packet based at least in part on the segment quantization factor and a cost constraint, wherein the second number of SIDs is associated with maximizing the SIDs included in individual ones of segment quantization intervals. In other words, the second number of SIDs is associated with maximizing the SIDs included in each segment quantization interval of one or more segment quantization intervals of the segment list. For instance, if the first number of micro SIDs (e.g., the capacity of a micro SID carrier) is 6, then the second number of SIDs should be equal to multiples of 6 (e.g., 6, 12, 18, 24, and so forth) in order to completely fill a micro SID carrier to its maximum capacity with micro SIDs that represent the SIDs. In this example, the segment quantization factor is 6, the first segment quantization interval is between the $1^{st}$ SID and the $6^{th}$ SID, the second quantization interval is between the $7^{th}$ SID and the $12^{th}$ SID, and so on. In some examples, the second number of SIDs of the SR path may be greater than or equal to a minimum number of SIDs associated with keeping a cost of the SR path below the cost constraint. Additionally, determining the SR path may be further based at least in part on determining the minimum number of SIDs associated with sending the packet from the first node to the second node while maintaining the path cost at a value that is less than or equal to the cost constraint.

In some examples, the cost constraint may be associated with a monetary cost (e.g., a dollar amount associated with sending the packet), a latency, a TE cost, an IGP cost, and the like. The cost constraint may comprise a maximum path cost that is associated with a sum of a user specified margin and the cost of the minimum cost path. The minimum cost path may be computed subject to a constraint that limits the number of micro SIDs for the path to a maximum number. In other words, the cost of the SR path, in at least one example, should be less than the sum of user specified margin plus the cost of the minimum cost SR path.

At operation 408, the method 400 includes modifying the packet to include at least the first number of micro SIDs. For instance, each one of the second number of SIDs may be modified such that a first SID of the second number of SIDs is represented by a first micro SID of the first number of micro SIDs, and so forth. In other words, each individual segment of the SR path and/or SID corresponding with the individual segment may be represented by a respective micro SID that comprises less bits or bytes than a traditional, 128-bit (16-byte) SID.

At operation 410, the method 400 includes causing the packet to flow from the first node to the second node via the SR path. In some examples, causing the packet to flow from the first node to the second node may further comprise sending instructions from a controller, such as controller 116, to the first node. The instructions may indicate one or more SR paths that the first node is to use when sending data to other nodes of the network. For example, the instructions may indicate a first SR path that the first node is to use when sending data to the second node, a second SR path that the first node is to use when sending data to a third node, and so forth. In some examples, SR path instructions may be stored by the various nodes of the network. The SR path instructions may be updated as nodes become unavailable due to, for example, faults related to the node, an amount of bandwidth available for the node, and the like.

FIG. 5 illustrates a flow diagram of another example method 500 for optimizing an SR path using micro SIDs. The method 500 begins with operation 502, which includes determining one or more shortest segment routing (SR) paths between a first node and a second node using, at most, one segment identifier (SID).

At operation 504, the method 500 includes determining, based at least in part on the paths computed in operation 502, the shortest SR paths between the first node and the second node using, at most, two SIDs. The shortest SR paths may include one or more SR paths between the first node and the second node. In some examples, operation 504 may be repeated one or more times to determine additional shortest SR paths between the first node and the second node using, at most, additional quantities of SIDs (e.g., four SIDS, eight SIDs, and so on).

At operation 506, the method 500 includes determining, based at least in part on the paths computed in operation 504, the shortest SR paths between the first node and the second node using, at most, an amount of SIDs that is equal to a segment quantization factor associated with the network or to a number of micro SIDs containable within a micro SID carrier. The segment quantization factor may represent the number of SIDs that can be pushed in a single pass in a forwarding ASIC, the number of micro SIDs in a micro SID carrier, and the like. In some examples, the capacity of a micro SID carrier for the network may be able to hold up to six micro SIDs, five micro SIDs, four micro SIDs, or another amount of micro SIDs specified by the network. The capacity of a micro SID carrier for a specific network may be set by a network administrator, a consumer of the network, and the like.

At operation 508, the method 500 includes determining, based at least in part on the paths computed in operation 506, the shortest SR paths between the first node and the second node using, at most, two micro SID carriers. In some examples, operation 508 may be repeated one or more times to determine additional shortest SR paths between the first node and the second node using, at most, additional quantities of micro SID carriers (e.g., three micro SID carriers, four micro SID carriers, and so forth). At operation 510, the method 500 includes determining, based at least in part on the paths computed in operation 508, the shortest SR paths between the first node and the second node using, at most, a maximum amount of micro SID carriers. In some examples, the maximum amount of micro SID carriers may be set by a network administrator, a network user, or the like. Additionally, or alternatively, the maximum amount of micro SID carriers may be associated with a cost constraint or the capability of hardware and software used in network equipment.

At operation 512, the method 500 includes identifying, based at least in part on the paths determined in operations 506-510, the SR path with the minimum amount of micro SID carriers whose path cost is less than a threshold path cost. In this way, an SR path that is defined by a number of segments equal to a capacity of one or more micro SID carriers may be used in order to minimize cost of the path, as well as to minimize overhead of the packet. Finally, at operation 514, the method 500 includes causing traffic to flow from the first node to the second node using the identified SR path.

FIG. 6 illustrates a flow diagram of yet another example method 600 for optimizing an SR path using micro SIDs. The method 600 begins at operation 602, which includes determining, at a computing device, that a packet is to be sent from a first node of a network to a second node of the network using a segment routing (SR) method. The packet may be sent from the first node to the second node via one or more intermediate nodes that are disposed along an SR path between the first node and the second node. Alternatively, the packet may be sent directly from the first node to the second node. The first node, the second node, and/or the one or more intermediate nodes may be associated with a network of nodes used for communicating data to various devices that utilize the network of nodes. In some examples, nodes may comprise one or more various networking and/or computing devices, such as routers, switches, hubs, gateways, and the like. Additionally, the first node, the second node, and/or the intermediate nodes may communicate with one another via one or more wired and/or wireless links. Further, the nodes may communicate with each other using one or more different communication methods or protocols.

At operation 604, the method 600 includes determining a first quantity of segment identifiers (SIDs) associated with sending the packet from the first node to the second node such that a path cost associated with the first quantity of SIDs is less than a threshold path cost. Typically, as the number/quantity of segments of an SR path and/or SIDs increases, the path cost may decrease. As such, the first quantity of SIDs may be further described as a minimum quantity/number of SIDs associated with keeping the path cost below the threshold path cost. In some examples, determining the first quantity of SIDs may be based at least in part on computing a first path cost associated with a first SR path defined by a single SID, computing a second path cost associated with a second SR path defined by two SIDs, computing a third path cost associated with a third SR path defined by three SIDs, and so forth, until a path cost is identified that is less than the threshold path cost.

At operation 606, the method 600 includes determining that the first quantity of SIDs is less than a micro SID carrier capacity. The micro SID carrier capacity may comprise one or more micro SID carriers. In other words, this operation includes determining that the last micro SID carrier required to accommodate the first quantity of SIDs is partially filled. In some examples, determining that the first quantity of SIDs is less than a micro SID carrier capacity may be based at least in part on a segment quantization factor. The segment quantization factor may indicate a number of micro SIDs that may be contained within a single micro SID carrier (e.g., a traditional 16-byte SID). For instance, if the number of micro SIDs containable within a single micro SID carrier is six, then the segment quantization factor may equal six. Likewise, if the number of micro SIDs containable within a single micro SID carrier is three, then the segment quantization factor may equal three, and so forth. In some instances, determining that the first quantity of SIDs is less than a micro SID carrier capacity may be based at least in part on dividing the first quantity of SIDs by the segment quantization factor, or other similar techniques. For instance, if a quotient resulting from dividing the first quantity of SIDs by the segment quantization factor is not a whole number (e.g., 1, 2, 3, etc.), then the first quantity of SIDs is less than a micro SID carrier capacity. In other words, additional micro SIDs may be containable within the micro SID carrier capacity.

At operation 608, the method 600 includes determining, based at least in part on the first quantity being less than the micro SID carrier capacity, an SR path between the first node and the second node, the SR path being defined by a second quantity of SIDs that is higher than the first quantity of SIDs and is equal to the micro SID carrier capacity except when the lowest cost SR path between the first node and the second node does not require as many micro SIDs as in the full capacity of the micro SID carriers. In other words, the second quantity of SIDs fully maximizes the capacity of one or more micro SID carriers. In some instances, determining the SR path may be based at least in part on determining a difference between the first quantity of SIDs and the micro SID carrier capacity (e.g., determining how many additional SIDs may be added to the first quantity to fully maximize the capacity of the micro SID carrier).

At operation 610, the method 600 includes modifying the packet to include the second quantity of SIDs, wherein individual ones of the second quantity of SIDs are represented by individual ones of micro SIDs. For instance, each SID determined to be used in the packet header to send the packet to the second node using the SR path may be converted into a micro SID that comprises less bits or bytes than the original SID. And finally, at operation 612, the method 600 includes causing the packet to flow from the first node to the second node via the SR path. Each individual micro SID may instruct the current segment how to forward the packet according to the SR path.

Figure 7:
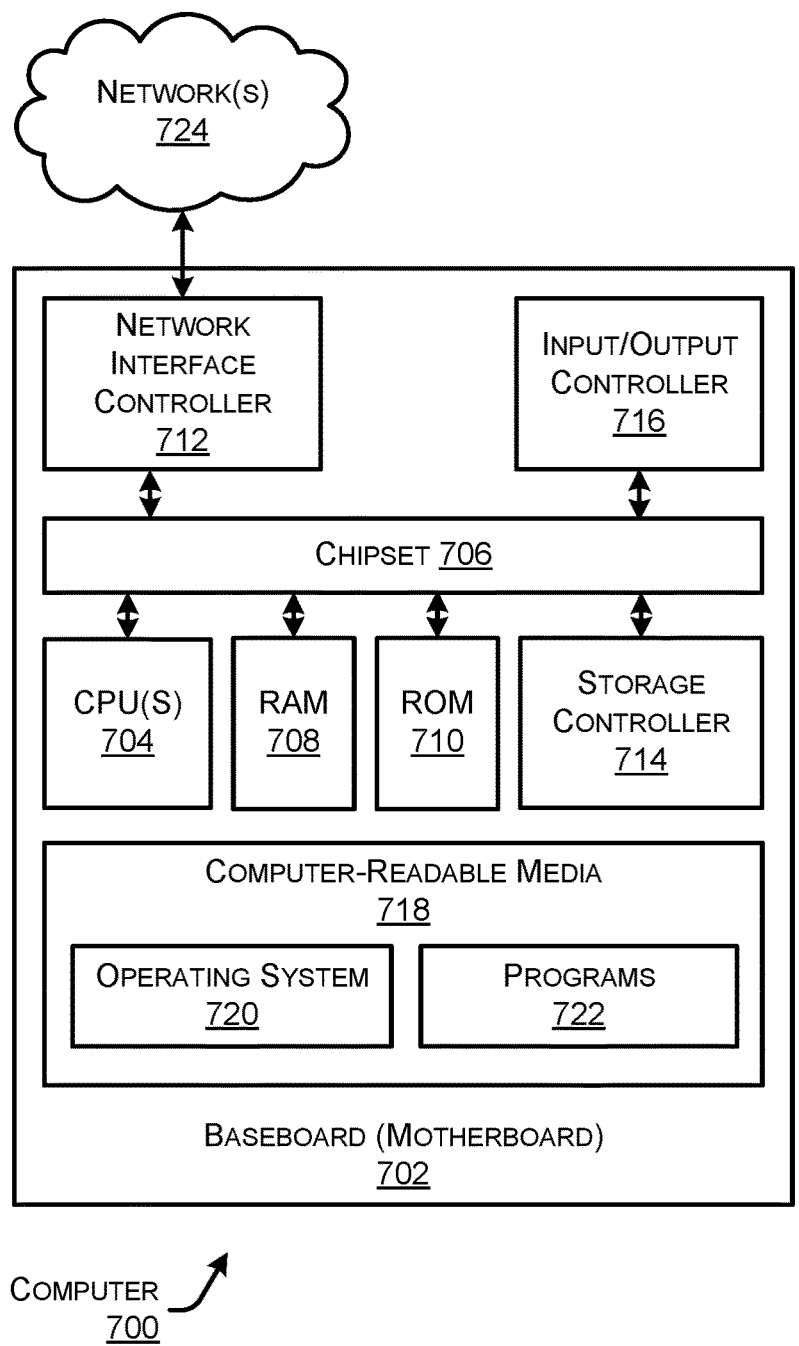
FIG. 7 is a computer architecture diagram showing an example computer hardware architecture of a computer that can be utilized to implement aspects of the various technologies presented herein.

FIG. 7 is a computer architecture diagram showing an example computer hardware architecture of a computer 700 that can be utilized to implement aspects of the various technologies presented herein. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a node 104, a client device 106, a server 110, and/or a controller 116 as described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through one or more networks 724. The networks 724 may be the same as or similar to the networks 108 described in FIG. 1. The chipset 706 can include functionality for providing network connectivity through a NIC 712, such as a gigabit Ethernet adapter. The NIC 712 is capable of connecting the computer 700 to other computing devices over the networks 724. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the node network 102 and or any components included therein, may be supported by one or more devices similar to computer 700. Stated otherwise, some or all of the operations performed by the node network 102, and or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the nodes 104 and controller 116. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for optimizing SR paths using micro SIDs. The programs 722 may enable the nodes 104 and/or the controller 116 to perform the various operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining, at a computing device, that a packet is to be sent from a first node of a network to a second node of the network using segment identifiers (SIDs) of a segment routing (SR) method;
   determining a segment quantization factor that is representative of a first number of SIDs that are included in a segment quantization interval;
   determining an SR path defined by a second number of SIDs to send the packet based at least in part on the segment quantization factor and a cost constraint, wherein the second number of SIDs is associated with maximizing the SIDs included in individual ones of segment quantization intervals;
   modifying the packet to include the second number of SIDs; and
   causing the packet to flow from the first node to the second node via the SR path.

2. The method of claim 1, wherein the segment quantization factor is further representative of at least one of a number of micro SIDs containable within a micro SID carrier or a number of SIDs that can be pushed in a single pass in a forwarding application-specific integrated circuit (ASIC).

3. The method of claim 1, further comprising determining, based at least in part on the cost constraint, a third number of SIDs associated with sending the packet from the first node to the second node, the third number of SIDs being associated with a path cost that is at least one of less than or equal to the cost constraint, wherein determining the SR path is further based at least in part on the third number of SIDs.

4. The method of claim 3, wherein the third number of SIDs is at least one of less than or equal to the second number of SIDs, and wherein the cost constraint is associated with an amount of at least one of a latency associated with the SR path, an Interior Gateway Protocol (IGP) metric associated with the SR path, or a Traffic Engineering (TE) metric associated with the SR path.

5. The method of claim 1, wherein the SR path comprises a first SR path, the method further comprising determining, based at least in part on the segment quantization factor, one or more additional SR paths between the first node and the second node, the one or more additional SR paths including at least a second SR path that is defined by a third number of SIDs, wherein the third number of SIDs is at least one of greater than or less than the second number of SIDs and is associated with maximizing the SIDs included in individual ones of segment quantization intervals.

6. The method of claim 1, wherein modifying the packet further comprises modifying individual ones of the second number of SIDs such that each SID of the second number of SIDs is represented by a respective micro SID.

7. The method of claim 1, wherein:
   the cost constraint comprises a maximum amount of a metric associated with the SR path,
   the second number of SIDs is associated with a first amount of the metric that is less than the maximum amount, and
   the metric comprises at least one of a latency, an Interior Gateway Protocol (IGP) metric, or a Traffic Engineering (TE) metric.

8. A system comprising:
   one or more processors; and
   one or more non-transitory computer-readable media storing instructions that, when executed by the one or more processors, cause the one or more processors to perform operations comprising:
      determining, at a computing device, that a packet is to be sent from a first node of a network to a second node of the network using segment identifiers (SIDs) of a segment routing (SR) method;
      determining a segment quantization factor that is representative of a first number of SIDs that are included in a segment quantization interval;
      determining an SR path defined by a second number of SIDs to send the packet based at least in part on the segment quantization factor and a cost constraint, wherein the second number of SIDs is associated with maximizing the SIDs included in individual ones of segment quantization intervals;
      modifying the packet to include at least the second number of SIDs; and
      causing the packet to flow from the first node to the second node via the SR path.

9. The system of claim 8, wherein the segment quantization factor is further representative of at least one of a number of micro SIDs containable within a micro SID carrier or a number of SIDs that can be pushed in a single pass in a forwarding application-specific integrated circuit (ASIC).

10. The system of claim 8, the operations further comprising determining, based at least in part on the cost constraint, a third number of SIDs associated with sending the packet from the first node to the second node, the third number of SIDs being associated with a path cost that is at least one of less than or equal to the cost constraint, wherein determining the SR path is further based at least in part on the third number of SIDs.

11. The system of claim 10, wherein the third number of SIDs is at least one of less than or equal to the second number of SIDs, and wherein the cost constraint is associated with an amount of at least one of a latency associated with the SR path, an Interior Gateway Protocol (IGP) metric associated with the SR path, or a Traffic Engineering (TE) metric associated with the SR path.

12. The system of claim 8, wherein the SR path comprises a first SR path, the operations further comprising determining, based at least in part on the segment quantization factor, one or more additional SR paths between the first node and the second node, the one or more additional SR paths including at least a second SR path that is defined by a third number of SIDs, wherein the third number of SIDs is at least one of greater than or less than the second number of SIDs and is associated with maximizing the SIDs included in individual ones of segment quantization intervals.

13. The system of claim 8, wherein modifying the packet further comprises modifying individual ones of the second number of SIDs such that each SID of the second number of SIDs is represented by a respective micro SID.

14. The system of claim 8, wherein:
the cost constraint comprises a maximum amount of a metric associated with the SR path,
the second number of SIDs is associated with a first amount of the metric that is less than the maximum amount, and
the metric comprises at least one of a latency, an Interior Gateway Protocol (IGP) metric, or a Traffic Engineering (TE) metric.

15. A system comprising:
one or more processors; and
one or more non-transitory computer-readable media storing instructions that, when executed by the one or more processors, cause the one or more processors to perform operations comprising:
determining that a packet is to be sent from a first node of a network to a second node of the network using segment identifiers (SIDs) of a segment routing (SR) method;
determining a segment quantization factor that is representative of a first number of SIDs that can be pushed in a first forwarding pass;
determining, based at least in part on the segment quantization factor, an SR path that is defined by a second number of SIDs to send the packet;
modifying the packet to include the second number of SIDs; and
causing the packet to flow from the first node to the second node via the SR path.

16. The system of claim 15, the operations further comprising receiving an indication of a desired packet forwarding rate, wherein the packet forwarding rate is at least one of user configured, platform specific, or network specific.

17. The system of claim 16, wherein determining the SR path is further based at least in part on the desired packet forwarding rate, and wherein the second number of SIDs is associated with maximizing the packet forwarding rate.

18. The system of claim 16, the operations further comprising determining a maximum number of segment quantization intervals associated with sending the packet from the first node to the second node based at least in part on the packet forwarding rate, and wherein the SR path is associated with a first number of segment quantization intervals that is less than the maximum number.

19. The system of claim 15, wherein modifying the packet further comprises modifying individual ones of the second number of SIDs such that each SID of the second number of SIDs is represented by a respective micro SID.

20. The system of claim 15, the operations further comprising:
receiving a first indication of a desired packet forwarding rate;
receiving a second indication of a cost constraint; and
calculating, based at least in part on the desired packet forwarding rate and the cost constraint, one or more segment lists for sending packets from the first node of the network to the second node of the network,
wherein determining the SR path comprises selecting the SR path based at least in part on the one or more segments lists such that a packet forwarding rate of the SR path is maximized while a cost of the SR path is minimized.

* * * * *